(12) United States Patent
Andersson

(10) Patent No.: US 6,394,502 B1
(45) Date of Patent: May 28, 2002

(54) ELECTROFUSION COUPLER

(75) Inventor: Thomas Andersson, Kungsör (SE)

(73) Assignee: Kungsors Plast AB, Kungsor (SE)

( * ) Notice: Subject to any disclaimer, the term of this patent is extended or adjusted under 35 U.S.C. 154(b) by 0 days.

(21) Appl. No.: 09/623,673

(22) PCT Filed: Mar. 5, 1999

(86) PCT No.: PCT/SE99/00333

§ 371 (c)(1),
(2), (4) Date: Sep. 26, 2000

(87) PCT Pub. No.: WO99/46532

PCT Pub. Date: Sep. 16, 1999

(30) Foreign Application Priority Data

Mar. 11, 1998 (SE) .............................. 9800789

(51) Int. Cl.⁷ ............................................. F16L 13/02
(52) U.S. Cl. ..................................................... 285/21.2
(58) Field of Search .............................. 285/21.1, 21.2, 285/123.15, 123.1, 93; B29C 65/35; F16L 47/02

(56) References Cited

U.S. PATENT DOCUMENTS

| 4,060,263 A | * 11/1977 | Kotcharian ................. 285/47 |
| 4,779,652 A | 10/1988 | Sweeney |
| 5,141,261 A | 8/1992 | Ziu |
| 5,277,455 A | 1/1994 | Graves et al. |
| 5,400,828 A | 3/1995 | Ziu et al. |
| 5,401,064 A | 3/1995 | Guest |
| 5,529,656 A | 6/1996 | Ewen et al. |

FOREIGN PATENT DOCUMENTS

| EP | 406 818 | 1/1991 |
| EP | 1 004 810 | 5/2000 |
| GB | 2281111 | 2/1995 |
| GB | 2 318 543 | 4/1998 |
| SU | 1737216 A | * 5/1992 ................. 285/21 |

* cited by examiner

Primary Examiner—Lynne H. Browne
Assistant Examiner—Aaron M Dunwoody
(74) Attorney, Agent, or Firm—Sughrue Mion, PLLC

(57) ABSTRACT

A fusion welding socket (18) for coupling together plastic pipes, is adapted to receive the pipe parts to be coupled together with a tight fit. The diameter of the ends (19) of the socket is greater than the diameter of the socket along an intermediate part (20) and the diameter at the ends is adapted to receive with a tight fit an outer pipe (1) and the diameter of the intermediate part is adapted to receive with a tight fit an inner pipe (2) of a double-pipe conduit which includes two coaxial pipes and a leakage detection space (3) therebetween. The socket includes coils (24–27) having resistance wires or filaments which enable the socket material to be fused locally together with the material in both the outer pipes and the inner pipes of two double-pipe conduits that are to be coupled together with the aid of the socket. The socket also includes at least one passageway (21) which interconnects the spaces in the socket on both sides of the intermediate socket part.

8 Claims, 4 Drawing Sheets

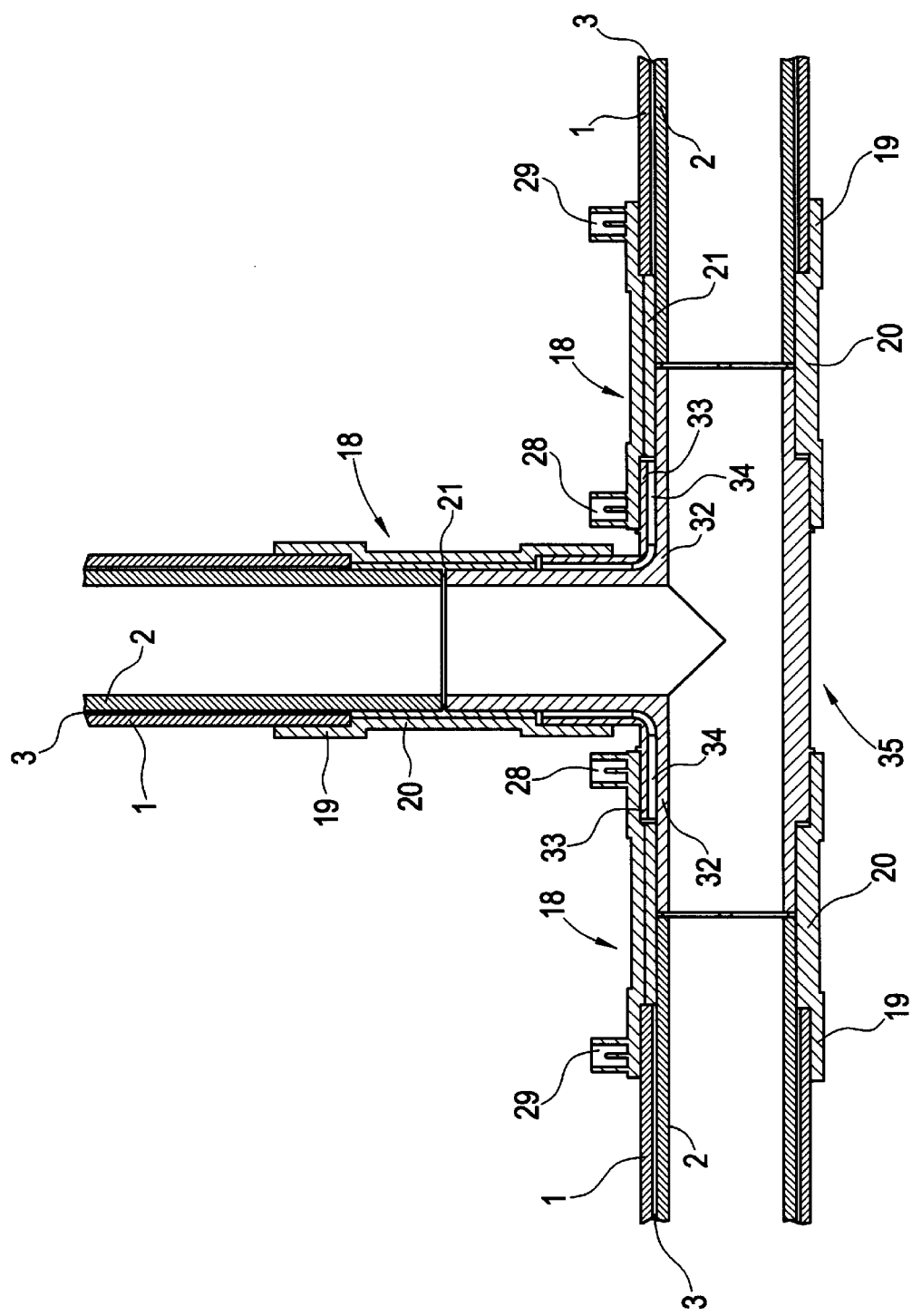

ELECTROFUSION COUPLER

BACKGROUND OF THE INVENTION

The present invention relates to an electrofusion coupler for use in joining together plastic pipes, wherein the coupler includes a welding socket which is adapted to receive the ends of the pipes to be joined together with a close fit and which incorporates coils of resistance wires or filaments which when energized cause the material in the welding socket to fuse together with the material in the pipe walls at the positions of said coils.

Couplers of this kind are used generally in joining together plastic pipes and in connecting plastic pipes to pipe bends, T-pieces and the like. The welding sockets are usually provided with inwardly projecting shoulders in their center regions and incorporate a resistance coil on each side of the shoulders. When joining two pipes together, the pipe ends can be inserted into the socket until stopped by the shoulders. The person coupling the pipes will then know that the pipes have been centered correctly in the socket. A voltage source is then connected to the coils. The material in the inner surface of the socket and in contact with the material at the pipe ends will therewith fuse together locally as a result of the heat generated in the resistance wires.

This represents a very simple and effective method of joining together simple pipe conduits. Many installation, for instance gasoline transporting installations, require the use of double conduits, i.e. conduits which include two coaxial pipes and which are constructed so as to provide an annular space between the radially inner and the radially outer pipe. This space is used to detect any leakage that may occur in the inner or the outer pipe, in addition to enhancing safety against leakage onto the surrounding ground. To this end, the space contains a gas, suitably air, that has a pressure in excess of or below the ambient pressure. The occurrence of a leakage can be detected, by monitoring the pressure in said space. It is important that pressure changes in the space between the pipes are able to propagate along the full length of a monitoring zone in a conduit system or pipework. When joining such pipes, the inner pipe must be joined per se and the outer pipe must be joined per se, such that communication is also obtained between the annular spaces in the mutually joined double conduits.

When using conventional couplers of the aforedescribed kind to effect such joins, it is first necessary to join the inner pipes together with the aid of a fusion welding socket that is fused together with the pipes in a first fusing operation. Prior to this, it is necessary to first place a cross-section reducing socket on each pipe end, these sockets each having a part into which the outer pipe tightly fits and a part of larger diameter which will accommodate the inner fusion welding socket for the inner pipes. These reduction sockets are intended to be joined with the aid of an outer welding socket of larger diameter. It is also necessary to push this outer socket onto a pipe end prior to welding the inner pipes together. The reduction sockets and the outer welding socket must then be welded together with respective outer pipes and with each other in a second welding operation.

A greater number of components and working operations are required in the case of T-couplings for instance. The use of such conventional fusion welding sockets in joining together double-pipe conduits is thus expensive because of the large number of components that must be used and because several welding operations must be carried out sequentially. Especially the division of the pipe welding into different working operations is time consuming.

SUMMARY OF INVENTION

A primary object of the present invention is to provide a technique which greatly simplifies the work of joining together double-pipe conduits.

In this regard, one object is to join together double-pipe conduits with the aid of one single fusion welding coupler.

Another object is to enable all welding operations to be carried out simultaneously when joining a T-coupling.

The invention is based on the realization that these objects can be achieved with the aid of a fusion coupler or welding socket that includes parts of mutually different diameters which will fit around the outer pipe and the inner pipe respectively of a double-pipe conduit, and which includes passageways that provide communication between the annular spaces of two double-pipe conduits joined together with the aid of the welding socket.

Reference in the following and in the claims to a pipe coupling and pipe joining operation implies joining together two double-pipe conduits and joining of one such conduit to a joint piece, a pipe bend, a T-coupling and the like that include double-pipes or pipes provided with passageways in the walls thereof with the intention of providing requisite communication with the space between the pipes in a double-pipe conduit.

The particular characteristic features of a fusion coupler of the kind defined in the first paragraph are that the welding socket has a larger diameter at its ends than along an intermediate part thereof, that the diameter at said ends is adapted to receive an outer pipe with a close fit and the diameter along said intermediate part is adapted to receive with a close fit an inner pipe of a double-pipe conduit that includes two coaxial pipes and a leakage detection space between said pipes, that the socket includes heating coils of resistance wires or filaments that when energized function to locally fuse the socket material with the material of both the outer pipes and the inner pipes in two double-pipe conduits to be joined together with the aid of the fusion welding socket, and that the fusion welding socket includes at least one passageway which interconnects the spaces in the socket on both sides of the intermediate part.

A fusion welding socket of this kind enables, for instance, two double-pipe conduits to be joined together with the aid of one single component and also enables all necessary fusion welding operations to be carried out in one s ingle step, by connecting an outer voltage source to two terminals on the socket. This greatly facilitates the work that is entailed in joining together double-pipe conduits, and also makes the work less expensive. Furthermore, the use of a single welding socket also enables a check to be made as to whether or not the inner pipe has been welded correctly, from outside the conduit.

Further characteristics of the invent ion will be apparent from the dependent claims.

BRIEF DESCRIPTION OF THE DRAWINGS

The invention will now be described in more detail with reference to exemplifying embodiments thereof and also with reference to the accompanying drawings.

FIG. 4 illustrates a T-coupling joined to double-pipe conduits with the aid of fusion welding sockets according to the present invention.

DETAILED DESCRIPTION OF THE INVENTION

Figure 1:
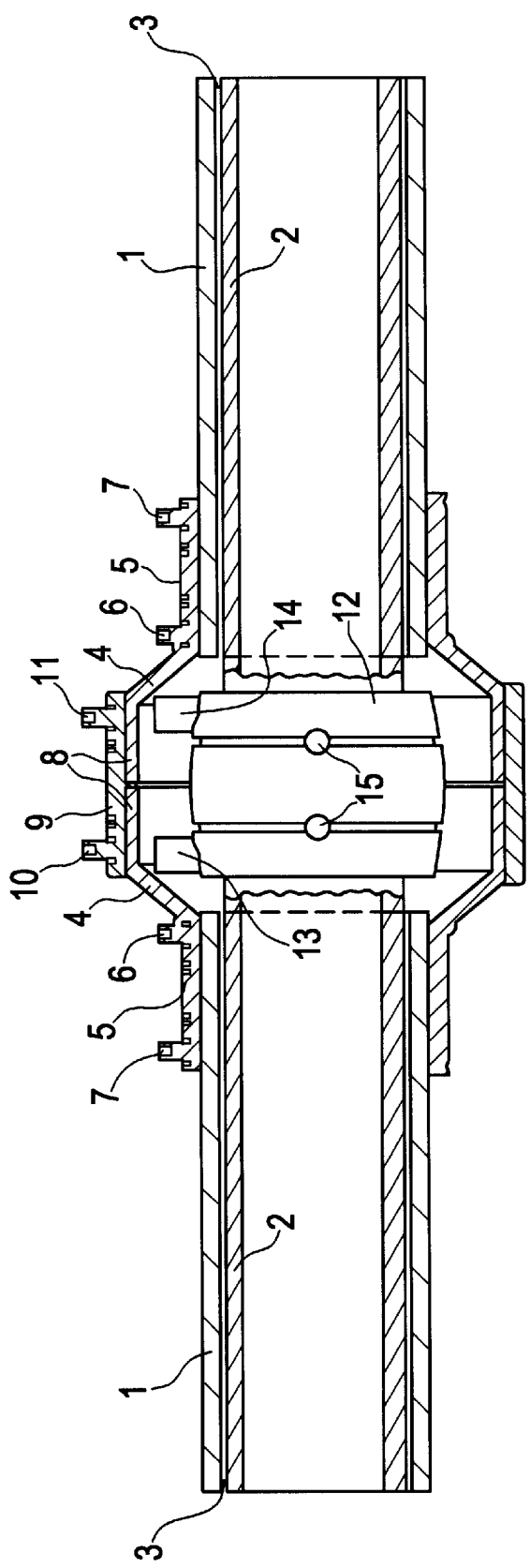
FIG. 1 illustrates joining of two double-pipe conduits with the use of conventional fusion welding sockets.

In FIG. 1 the numeral 1 identifies the outer pipe and numeral 2 the inner pipe of a double-pipe conduit, and numeral 3 identifies a free space between the outer and inner pipes. Pipes of this kind are used, among other things, in underground conduits for transporting gasoline in gas stations and the like. The double pipes enhance security against leakage. Any fluid leaking through the inner pipe 2 will be collected in the annular space 3 between the pipes and conducted to the lowest point of the conduit.

The annular space 3 can also be used as a leakage control means, wherewith the space is filled with gas, suitably air, at a pressure higher than or lower than atmospheric pressure. The imperviousness of the outer pipe 1 and the inner pipe 2 can be checked, by monitoring the pressure in the space 3.

When joining such pipes together, however, there arises the problem that the annular passageway 3 between the outer pipe and the inner pipe must also be sealed at the joint location against both the space in the inner pipe 2 and the atmosphere outside the outer pipe 1.

FIG. 1 illustrates how such a joint is effected at present with the aid of conventional fusion welding sockets. The procedure in this case is as follows:

The outer pipe 1 is removed along an end part of respective conduits. A reduction socket 4 is then fitted onto respective pipe ends. The socket 4 has a cylindrical part 5 which is designed as a fusion welding socket which incorporates a heating coil comprising resistance wires or filaments to which electric current can be supplied via two terminals 6 and 7 respectively. The reduction socket 4 has a second cylindrical part 8 of larger diameter. The diameter of the part 5 is such as to enable the outer pipe 1 to be inserted thereinto with a close fit. A fusion welding socket 9 is also fitted on one pipe end, the diameter of said fusion welding socket being sufficiently large to fit on the cylindrical part 8 of the reduction socket 4 with a close fit. The fusion welding socket 9 incorporates a resistance coil at each end, said coils being energized by the terminal connections 10, 11.

The exposed ends of the inner pipe 2 are then inserted into the center of an inner fusion welding socket 12 principally of the same design as the aforesaid socket 9 that incorporates two resistance coils connected to respective terminal connections 13 and 14 of the socket.

In a first fusion welding operation, a voltage source is connected to the terminals 13 and 14 and the coils incorporated in the socket therewith energized to heat the socket material and the material at the ends of the inner pipes 2, so as to fusion weld the socket 12 to respective pipe ends. This results in a tight join of the inner pipes 2. The reduction sockets 4 are then moved to the illustrated position on respective outer pipes and the outer fusion welding socket 9 is moved to a position in which it is centered over the join between the parts 8 of the reduction sockets. Respective terminal connections 6, 7 and 10, 11 are then coupled to a voltage source in order to fuse weld the cylindrical parts of the reduction sockets 4 with respective outer pipes and the fusion welding socket 9 with respective end-parts of the reduction sockets 4. This can be effected in two mutually sequential welding operations or at one and the same time.

Thus, four components and at least two fusion welding operations are required to effect such a joint, it being necessary to carry out these operations at different points in time. The pipe joining work is thus a time consuming and relatively expensive operation. Furthermore, it is not possible to subsequently check whether or not welding of the inner pipe has been carried out correctly, since the indicating means 15 which enable such checks to be carried out are hidden by the outer welding socket.

Figure 2:
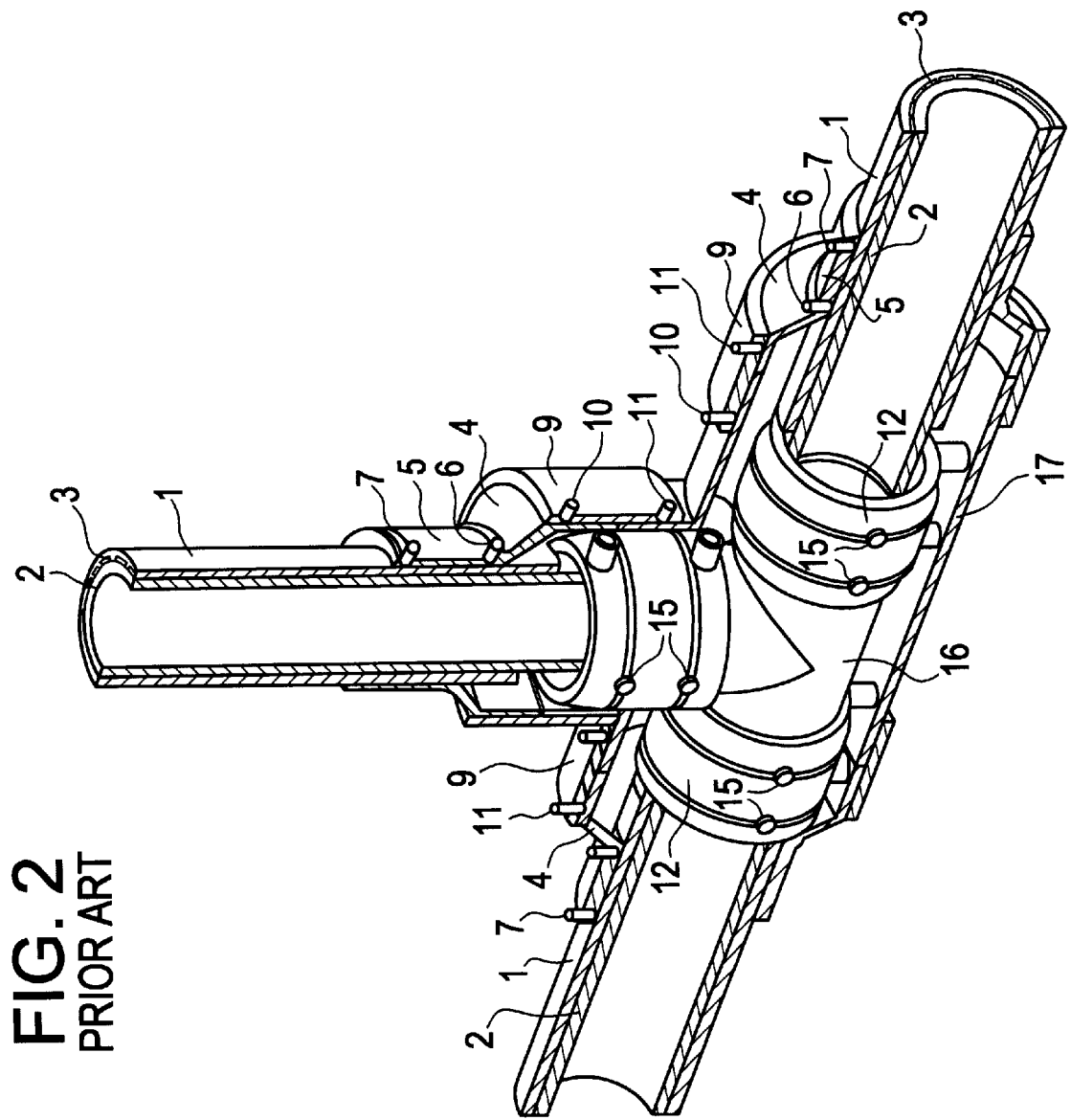
FIG. 2 illustrates joining of a T-coupling to double-pipe conduits with the aid of conventional fusion welding sockets.

FIG. 2 illustrates application of the conventional technology when joining together three double-pipe conduits with the aid of a so-called T-coupling. As will be apparent from the Figure, this operation requires the use of a large number of components. Firstly, the inner pipes must be coupled together with the aid of an inner T-shaped tubular part 16 which is joined to respective inner pipes with the aid of three welding sockets 12 of the same type as those used in the straight join shown in FIG. 1. It is then necessary to connect an outer T-shaped tube part 17 to the outer pipes 1 with the aid of reduction welding sockets 4 and outer welding sockets 9 in a manner similar to that used in the straight join shown in FIG. 1. Thus, a total of eleven components and at least two time-spaced welding operations are required, with associated time consumption and cost. As in the former case, it is not possible to check whether or not the welding operations carried out in joining the inner pipes have been effected correctly, in conjunction with a final inspection of a pipework system.

Figure 3:
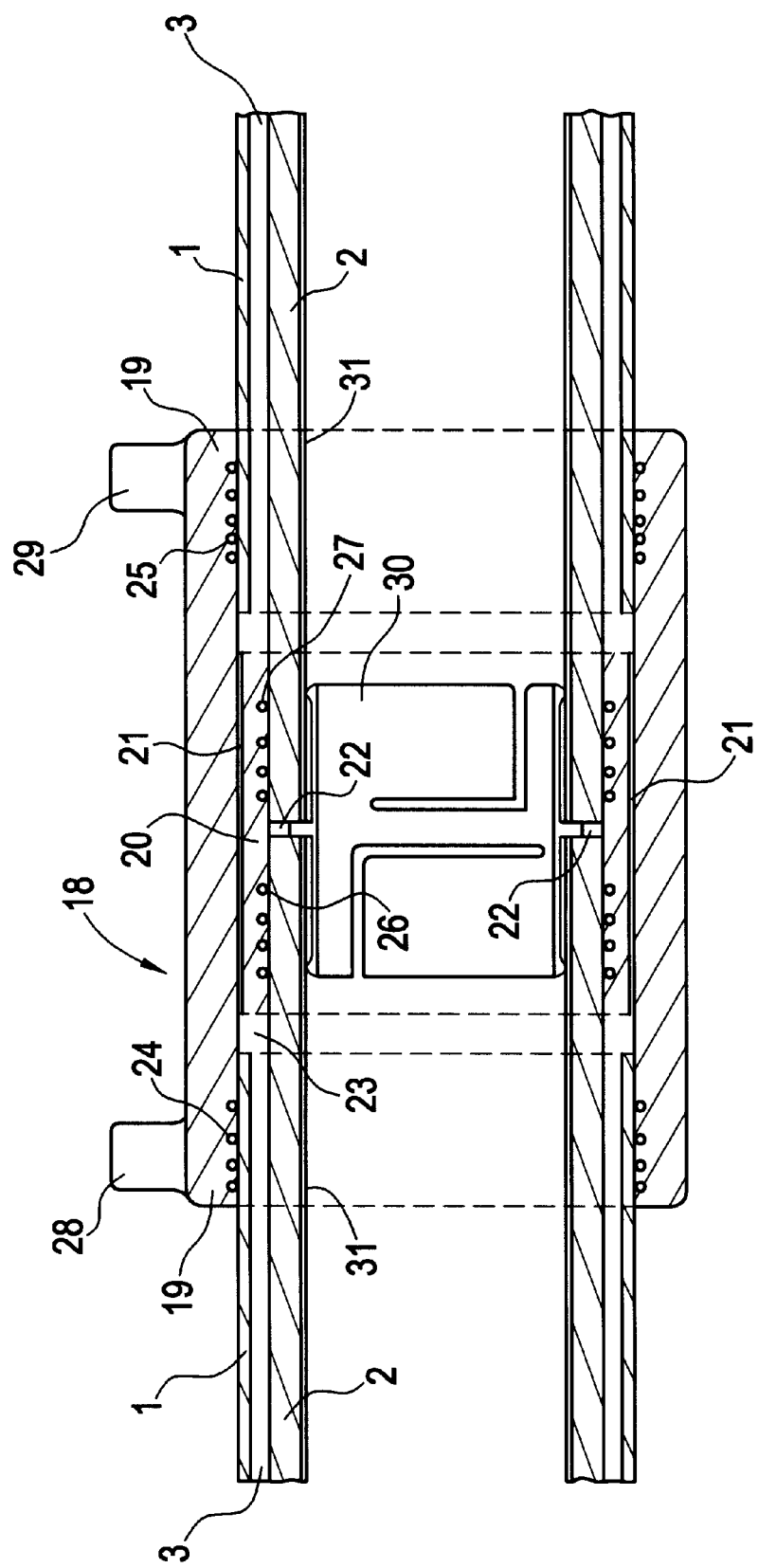
FIG. 3 illustrates an inventive fusion welding socket for joining together two double-pipe conduits.

FIG. 3 illustrates the use of an inventive fusion welding socket 18 in joining two double-pipe conduits that include an outer pipe 1, an inner pipe 2 and an intermediate annular space 3. The socket 18 includes two end-portions 19 that have a diameter which will permit the outer pipe 1 to be fitted therein with a close fit. An intermediate part 20 of the socket 18 has a smaller diameter, which receives the inner pipe 2 with a close fit. The intermediate part 20 is through-drilled with a number of passageways 21 that interconnect the spaces in the socket 18 on both sides of the intermediate part 20. These passageways can be provided by moulding a desired number of narrow tubular elements, e.g. steel tubes, suitably from two to four tubes, in the socket 18 during its manufacture.

An inventive socket 18 is used in following way to establish a join with the aid of said socket.

As in the former case, the outer pipe 1 is removed along an end-part of those conduits to be joined together. The inner pipes 2 are then inserted into those parts 20 of the socket 18 having the smallest diameter until meeting an inwardly projecting stop flange 22, therewith indicating that the socket has been centered over the join. The outer pipes 2 have been inserted into those parts 19 of the socket 18 having the larger diameter at the same time. The outer pipes 1 are shorter than the inner pipes 2 by an extent that will form a gap 23 between respective ends of the outer pipes and the adjacent end of the intermediate part 20 of the socket 18. As will be apparent, all of this is effected in one working step.

The socket 18 has embedded therein four resistor coils 24, 25, 26, 27, of which two, 24, 25, are embedded in the cylindrical socket parts 19 of large diameter and two, 26 and 27, are incorporated in the cylindrical socket part 20 of smaller diameter. All coils are coupled together, suitably in series with one another, and connected electrically to two terminal connections 28 and 29 respectively. When the terminals 28 and 29 are connected to a voltage source, the heating coils will cause the socket 18 to be fusion welded to the outer pipes 1 and also to the inner pipes 2, in one and the same operation.

Communication between the annular gap 3 of respective double-pipes is achieved with the aid of said incorporated passage-ways 21. The sites at which the materials have fused together can be checked from outside the conduit system and on subsequently occasions with the aid of conventionally holes filled with material which enable it to be seen whether or not the material has melted to the extent desired. A joint of this kind can be realized in a very short period of time and with the use of one single component and one single fusion welding operation.

As will be seen from FIG. 3, there is included an inner sleeve 30 which bridges the join between the inner pipes 2. The sole purpose of this sleeve is to connect an inner conductive layer 31 of the inner pipes such as to carry away any static electricity that may arise when a liquid medium flows through the pipe. The sleeve 30 is thus comprised of an electrically conductive material which will suitably have a slight resiliency such that it will abut the inner layer of the pipes with a certain force. The sleeve has no function with respect to the described joint as such and is omitted when no electrical connection between the pipes is required.

In this case there is required a T-shaped pipe-section that includes an inner pipe 32 and an outer pipe 33, and passageways 34 through which the annular spaces 3 in the connecting pipe conduits communicate with each other. The passageways 34 can be provided with the aid of recesses in the inner surfaces of respective outer pipes or by moulding bent pipes in the outer pipes 33 of the T-shaped pipe section.

Such a T-shaped pipe section can he coupled to said connecting double-pipe conduits with the aid of a fusion welding sleeve of the kind described in FIG. 3, for each such coupling.

In FIG. 4, each welding socket includes four terminal connections which enable welding of the outer pipes and of the inner pipes to be effected in mutually separate operations, if so desired. However, these operations can be carried out simultaneously, of course, and the terminals can therewith be connected in pairs. The welding sockets used are suitably of the kind shown in FIG. 3. This embodiment also includes electrically conductive sleeves 30 for establishing electric connection between the inner conductive layer of the inner pipes, so as to drain off any static electricity that may be present.

As evident from FIG. 4, a T-coupling 35 is effected with the aid of only four components instead of the eleven components required when applying the known technique according to FIG. 2. The cost is correspondingly reduced and a time saving is made by virtue of the fact that all welding operations can be carried out at one and the same time. The result can also be subsequently checked, e.g. in conjunction with a final inspection of an installation.

The invention has been described above with reference to making a straight join and a T-coupling respectively. It will be understood, however, that the invention can be applied in other contexts, such as for coupling pipe bends, terminating sockets and connecting sockets, reduction elements, and so on. As will be understood by one skilled in this art, the passageways required through the intermediate parts of the fusion welding sockets can be obtained in different ways and in various forms. The main criterion is that the passageways are able to maintain communication between the annular spaces of the connected conduits.

What is claimed is:

1. A fusion welding socket for use in coupling together plastic pipes, wherein the socket (18) is intended to receive the ends of pipe parts (1, 2) to be coupled together with a tight fit, and has embedded therein heating coils (24–27) which comprise resistance wires or filaments and which, when energized, function to fusion weld the socket material to the material in the pipe walls at the positions of said coils, wherein the diameter of the ends (19) of the socket is greater than the diameter along an intermediate part (20) of said socket; the diameter at said socket ends is adapted to receive, with a close fit, an outer pipe (1) and the diameter along said intermediate part is adapted to receive, with a close fit, an inner pipe (2) of a double-pipe conduit which includes two coaxial pipes and a leakage detection space (3) located between said coaxial pipes; the socket includes heating coils (24–27) comprising resistance wires or filaments which enable the socket material to be fusion welded with the material of both the outer tubes (1) and the inner tubes (2) of two double-pipe conduits to be connected together with the aid of the socket, locally at the positions of said coils; and the socket includes at least one passageway (21) which mutually connects the spaces in the socket on both sides of the intermediate part (20).

2. A fusion welding socket according to claim 1, wherein said at least one passageway (21) opens out at a given distance from the position to which the outer pipe (1) of a double-pipe conduit to be connected to the socket (18) can be inserted into said socket.

3. A fusion welding socket according to claim 1, which includes 2 to 4 passageways (21) in the form of tubular elements moulded in said socket.

4. A fusion welding socket according to claim 1, wherein the socket (18) includes four coils of resistance wires or filaments, of which two coils (24, 25) are embedded in the ends (19) of the sockets that have said larger diameters and two coils (26, 27) are embedded in the intermediate part (20) of said smaller diameter and on both sides of a center point of said intermediate part.

5. A fusion welding socket according to claim 4, wherein the coils (24–27) are mutually coupled and are connected to two common terminal connections (28, 29) in the socket (18).

6. A fusion welding socket according to claim 5, wherein all coils (24–27) are series connected between said terminal connections (28, 29).

7. A fusion welding socket according to claim 6, wherein the intermediate socket part (20) of said smaller diameter includes inwardly projecting stop means (22) at the center of the socket (18).

8. A fusion welding socket according to claim 7, wherein said stop means (22) has the form of a ring-shaped flange.

* * * * *